United States Patent
Russel et al.

(10) Patent No.: US 7,588,657 B2
(45) Date of Patent: Sep. 15, 2009

(54) PATTERN-FREE METHOD OF MAKING LINE GRATINGS

(75) Inventors: William B Russel, Princeton, NJ (US); Stephen Y Chou, Princeton, NJ (US); Leonard F Pease, III, Richland, WA (US); Parikshit A Deshpande, Princeton, NJ (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 10/953,906

(22) Filed: Sep. 29, 2004

(65) Prior Publication Data

US 2005/0167046 A1 Aug. 4, 2005

Related U.S. Application Data

(60) Provisional application No. 60/506,789, filed on Sep. 29, 2003.

(51) Int. Cl.
| | |
|---|---|
| *B32B 37/06* | (2006.01) |
| *B32B 37/10* | (2006.01) |
| *B32B 37/14* | (2006.01) |
| *B29C 65/48* | (2006.01) |
| *B22C 13/04* | (2006.01) |
| *C08J 7/04* | (2006.01) |
| *H01L 21/302* | (2006.01) |
| *B32B 37/16* | (2006.01) |
| *B29C 65/44* | (2006.01) |
| *H01L 21/304* | (2006.01) |

(52) U.S. Cl. .......... 156/242; 156/244.27; 156/295; 164/235; 264/241; 264/293; 427/473; 427/512; 216/16; 216/20; 438/700

(58) Field of Classification Search .......... 164/235, 164/249; 156/244.27, 242, 295, 323, 358, 156/280.8; 65/45; 264/45.1, 241, 293; 427/473, 427/512; 216/6, 13, 16, 18, 20, 22, 44, 49; 438/691, 700

See application file for complete search history.

(56) References Cited

U.S. PATENT DOCUMENTS

| | | | | |
|---|---|---|---|---|
| 3,444,732 | A | * | 5/1969 | McKinley et al. ......... 73/150 A |
| 4,890,763 | A | * | 1/1990 | Curiel ....................... 229/102 |
| 5,658,411 | A | * | 8/1997 | Faykish ..................... 156/233 |
| 5,772,905 | A |   | 6/1998 | Chou |
| 6,214,443 | B1 | * | 4/2001 | Palmasi et al. .............. 428/203 |

(Continued)

OTHER PUBLICATIONS

X. M. Zhao, Y. Xia and G. M. Whiteside, "Soft Lithographic Methods ofr Nano-Fabrication," Materials Chem. 7 pages 1069-1074 (1997).

(Continued)

*Primary Examiner*—Philip C Tucker
*Assistant Examiner*—Sonya Mazumdar
(74) *Attorney, Agent, or Firm*—Polster, Lieder, Woodruff & Lucchesi, L.C.

(57) ABSTRACT

In accordance with the invention, substrate-supported linear arrays are formed by the steps of adhering a thin layer of polymer between a pair of substrates and separating the substrates perpendicular to the layer. The polymer layer separates to form substrate-supported polymer gratings on both substrates, each grating having a period proportional to the thickness of the layer. The process has been used to make gratings with periods in the sub-micron range or larger over areas covering square centimeters.

34 Claims, 8 Drawing Sheets

U.S. PATENT DOCUMENTS

| | | | | |
|---|---|---|---|---|
| 6,309,580 B1* | 10/2001 | Chou | | 264/338 |
| 6,482,742 B1* | 11/2002 | Chou | | 438/690 |
| 6,842,742 B1* | 1/2005 | Brookner | | 705/60 |
| 6,860,956 B2* | 3/2005 | Bao et al. | | 156/232 |
| 6,932,934 B2* | 8/2005 | Choi et al. | | 264/496 |
| 2002/0025408 A1* | 2/2002 | Davis | | 428/141 |
| 2002/0123227 A1* | 9/2002 | Winningham et al. | | 438/700 |
| 2004/0082178 A1* | 4/2004 | Kamins et al. | | 438/691 |

OTHER PUBLICATIONS

S. Y. Chou and L. Zhung, "Lithography Induced Self-Assembly of Periodic Polymer Micropillar Arrays," J. Vac. Sci. Techno. B17, pp. 3197-3202 (1999).

E. Schäffer, T. Thurn-Albrecht, T. B. Russell and U. Steiner, "Electrically Induced Structure Formation and Pattern Transfer," Nature (London) 403, pp. 874-877 (2000).

P. Deshpande, L. F. Pease, III, L. Chen, S. Y. Chou and W. B. Russell, "Cylindrically Symmetric Electrohydrodynamic Patterning", Physical Review E 70, pp. 041601-1 to 041601-12 (2004).

X. Lei, L. Wu, P. Desphpande, Z. Yu, W. Wu, H. Ge and S. Y. Chou, "100 nm Period Gratings Produced by Lithographically Induced Self-Construction", Nanotechnology 14, pp. 786-790 (2003).

Y. Yamazaki and A. Toda, "Dynamical-Morphological Property of Adhesive Tape in Peeling," Journal of the Physical Society of Japan, vol. 71, No. 7, pp. 1618-1621 (2002).

V. Shenoy and A. Sharma, "Stability of a Thin Elastic Film Interacting With a Contactor," Journal of Mechanics and Physics of Solids, 50, pp. 1155-1173 (2002).

R. E. Robertson, V. Mindroiu and M. F. Cheung, "Fracture in Epoxy Matrix Resims," Composite Science and Technology, vol. 22, Issue 3, pp. 197-207 (1985).

E. B. Gorokhov, V. Y. Prinz, A. G. Noskov and T. A. Gavrilova, "A Novel Nanolithographic Concept Using Crack-Assisted Patterning and Self-Alignment technology", J. Electrochem. Soc., vol. 145, No. 6, pp. 2120-2131 (1998).

T. Bailey, B. J. Cohi, M. Colburn, M. Meissl, S. Shaya, J. G. Ekerdt, S. V. Sreenivasan and C. G. Wilson, "Step and Flash Imprint Lithography: Template Surface Treatment and Defect Analysis," J. Vac. Sci. Tech., B, 18(6), pp. 3572-3577 (2000).

L. F. Pease, III, P. Desphpande, S. Y. Chou and W. B. Russel, "Polymeric Gratings Via Fracture with Deep Sub-Micron length Scales and Large Areas," Proc. XIVth Int. Congr. on Rheology (2004).

* cited by examiner

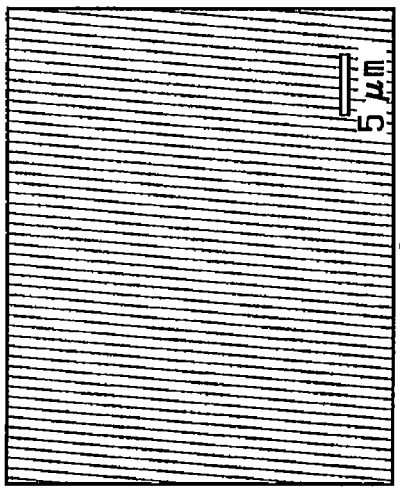
FIG. 5A  75°C
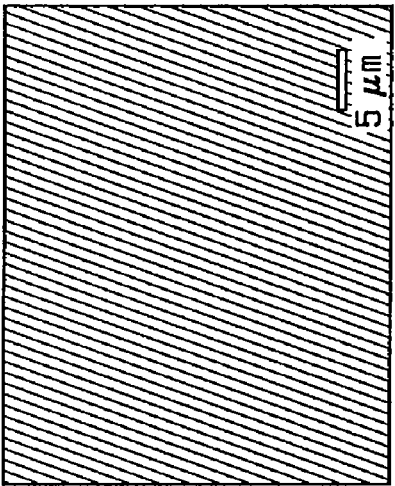
FIG. 5B  100°C
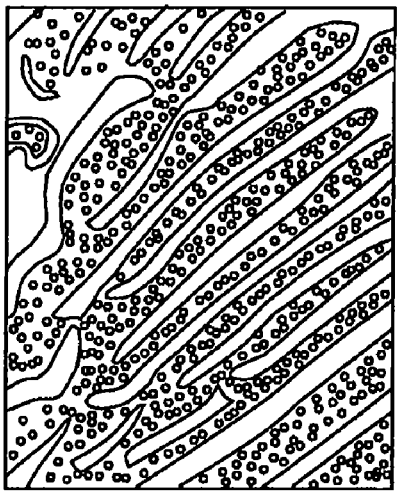
FIG. 5C  130°C
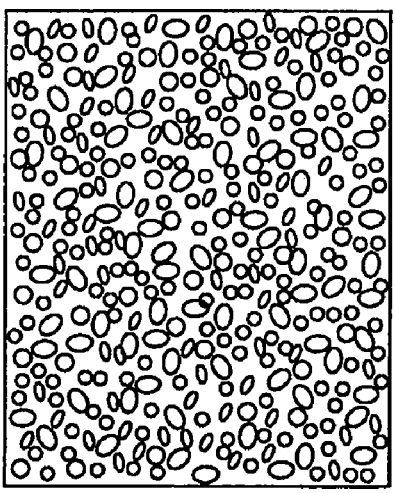
FIG. 5D  150°C
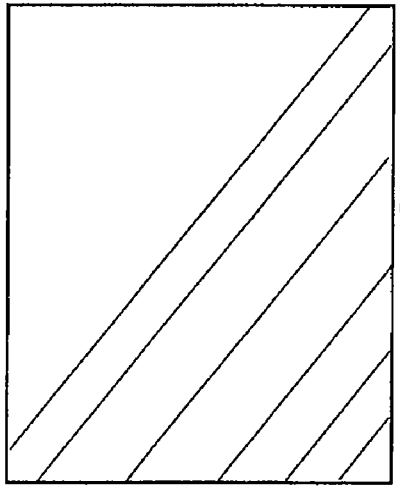
FIG. 5E  195°C
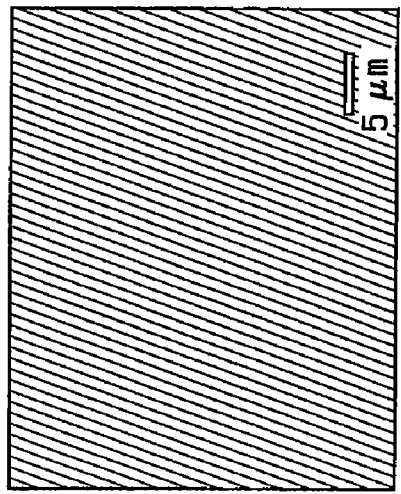
FIG. 5F  195°C THEN COOLED TO ROOM TEMP

PATTERN-FREE METHOD OF MAKING LINE GRATINGS

CROSS REFERENCE TO RELATED APPLICATIONS

This application claims the benefit of U.S. Provisional Patent Application Ser. No. 60/506,789 filed by the present inventors on Sep. 29, 2003 and entitled "Nanopatterning in Stressed Materials", which application is incorporated herein by reference.

GOVERNMENT INTEREST

This invention was made with government support from the Department of Defense through a NDSEG fellowship (F46920-99-C-0054), the NSF MRSEC Program (NSF-DMR-0213706) and DARPA (DAAD 19-99-1-0219). The government has certain rights to this invention.

FIELD OF THE INVENTION

This invention relates to methods of making devices having patterns and, in particular, to a method of making devices having one or more linear arrays without the use of patterned masks or molds.

BACKGROUND OF THE INVENTION

Methods of patterning devices with linear arrays are of great importance in the fabrication of a wide variety of electronic, optical and micro-mechanical devices. Such patterning is typically achieved by photolithography (exposing photoresist through a patterned mask), or by imprint lithography (imprinting a resist by a patterned mold). (See Reference 1 of Appendix A, hereinafter [1]).

Unfortunately both techniques depend on patterned masks or molds which must be precisely fabricated. The fabrication of such tools is expensive and time-consuming.

Linear arrays are basic components in many devices. Such arrays, typically comprised of narrow protruding line regions spaced apart by narrow recessed regions, can be used in the fabrication of optical gratings, optical filters, microcircuits, MEMs devices, micro/nano fluidic devices, interconnects and devices for processing long chain polymers such as biological molecules. Processes to make linear devices are also used to make memory devices, magnetic storage devices, and templates for cell growth and adhesion. New methods of making linear arrays inexpensively, especially in large areas, would be highly desirable.

SUMMARY OF THE INVENTION

In accordance with the invention, substrate-supported linear arrays are formed by the steps of adhering a thin layer of polymer between a pair of substrates and separating the substrates perpendicular to the layer. The polymer layer separates to form substrate-supported polymer gratings on both substrates, each grating having a period proportional to the thickness of the layer. The process has been used to make gratings with periods in the sub-micron range or larger, over areas covering square centimeters.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIGS. 5A through 5E show the lines produced by separation at different indicated temperatures;

It is to be understood that these drawings are for purposes of illustrating the concepts of the invention and, except for graphs and photographs, are not to scale.

DETAILED DESCRIPTION

This description is divided into two parts. Part I describes the basic process of the invention, and Part II, written for those skilled in the art, describes applicants' best current understanding of the physical mechanisms underlying the operation of the invention.

I. The Basic Processes

Figure 1:
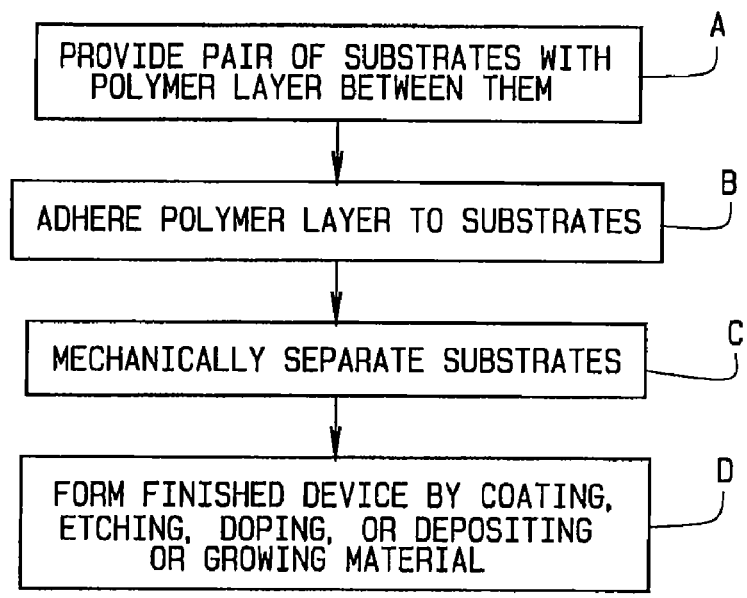
FIG. 1 is a schematic block diagram of the steps involved in fabricating a linear array in accordance with the invention.

Referring to the drawings, FIG. 1 is a schematic block diagram of the steps involved in fabricating a linear array in accordance with the invention. The first step, shown in Block A, is to provide a workpiece comprising a thin layer of polymer sandwiched between a pair of substrates. Preferably the substrates have smooth, continuous contact surfaces. They are preferably planar or curved. While patterning is not necessary to form the gratings because this method not a molding process, so long as the polymer is adhered to the surfaces, it is possible to use topologically patterned surfaces to modulate the configuration of the surface on which the gratings are formed.

The preferred method of providing the sandwich structure is to coat a thin layer of polymer on one substrate (the initial substrate) and to apply a second substrate (the masking substrate) into continuous contact with the coating. The polymer can be coated by spin coating, dip coating or any of a variety of other known techniques for applying thin polymeric layers. The polymer can also be applied as a pre-existing thin sheet. Preferably the polymer layer (coating or sheet) has a thickness in the range 50-1,000,000 nanometers.

Figure 2A:
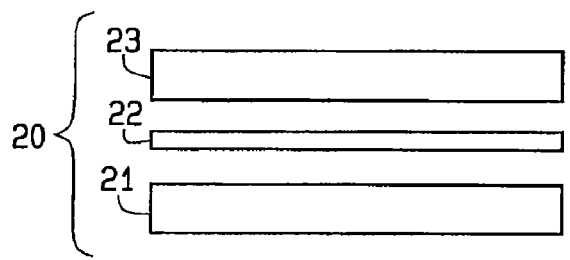
FIGS. 2A, 2B, 2C and 2D are schematic cross sections of a workpiece at various stages of the FIG. 1 process.

FIG. 2A is a schematic cross section showing the sandwiched workpiece 20 comprised of an initial substrate 21, a thin polymer layer 22, and a masking substrate 23. The substrates 21, 23 can be any of numerous rigid materials adherent to the polymer and sufficiently strong to permit separation. Advantageous substrates include glass, quartz, semiconductors, and metals. It should be noted that neither substrate is patterned. Each substrate advantageously presents a continuous contact surface, preferably planar, that will adhere to the polymer layer. Substrates less than 2 cm in maximum lateral dimension yield grating lines which may be curved on the tens of microns length scale, but larger substrates produce gratings with parallel lines that are much straighter with curvature, if any, on the millimeter length scale.

The polymer 22 can be chosen from a wide variety of adherent polymeric materials including polystyrene, poly (methyl methacrylate), polycarbonate, poly-L-lactide and polystyrene blends. Glassy polymers, whether brittle or ductile, can be used to produce gratings, and it is believed that molecular glasses and crystalline polymers will also produce gratings. Grating formation appears independent of polymer molecular weight.

An advantageous specific combination of materials comprises polystyrene (PS) sandwiched between silicon substrates.

The next step (Block B) is to assure adhesion of the polymer to the substrates. This can be affected by pressing the substrates together against the polymer layer. Optionally the polymer can also be heated, preferably above its glass transition temperature. Typical pressures are in the range of ten psi to several hundred psi. After several minutes, the pressure can be relieved. If heated above the glass transition temperature, the system should be cooled below the transition temperature before the substrates are separated. Typical material combinations require some pressing. Experiments have successfully been conducted with only pressing at room temperature, so heating is, in some cases, optional.

The third step (Block C) is to mechanically separate the substrates. Preferably the separation is substantially normal to the polymer layer. The separation is advantageously effected starting along one edge, with tensile stress perpendicular to the surface of the polymer layer. Separation can be facilitated by inserting a blade (e.g. razor blade) between the two substrates to wedge them apart. After separation, both substrates have linear gratings of polymeric material on the surfaces that contacted the polymer layer. The periods of the gratings are uniform and substantially equal. The periods are directly proportional to the thickness of the film. Specifically the period is about four times the film thickness (4±1). Remarkably, the grating lines are regularly spaced over a large area encompassing ten to tens of thousands of periods, e.g. from about 10 to about 100,000 periods.

Figure 2B:
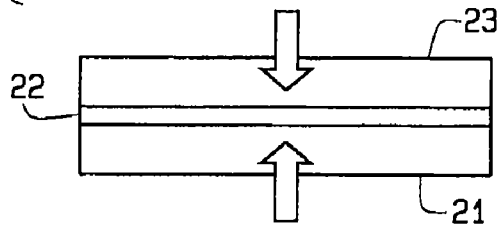
Figure 2C:
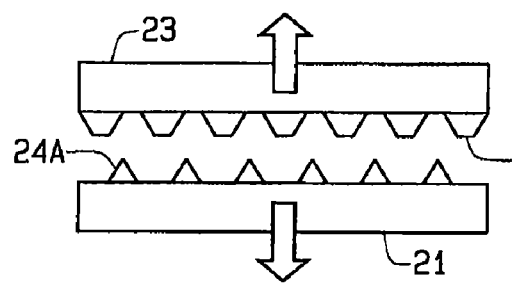
Figure 2D:
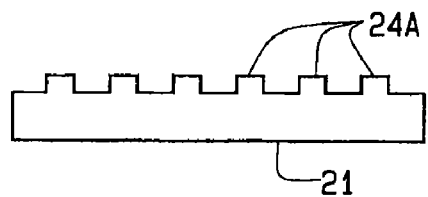

FIGS. 2B, 2C and 2D illustrate the formation of the gratings. FIG. 2B shows the polymer layer 22 adhered to substrates 21 and 23 and stretched by tensile stress normal to the plane of the polymer layer. FIG. 2C illustrates new regions 24A and 24B formed of the polymer by cohesive failure (i.e. the polymer separates into different regions). It should be noted that after separation, polymer gratings 24A, 24B (with different cross sections) are formed on both the initial substrate 21 and the mask substrate 23, respectively. As can be seen, the gratings on the two substrates have respectively different interlocking morphologies (i.e. the gratings would fit together).

Figure 3A:
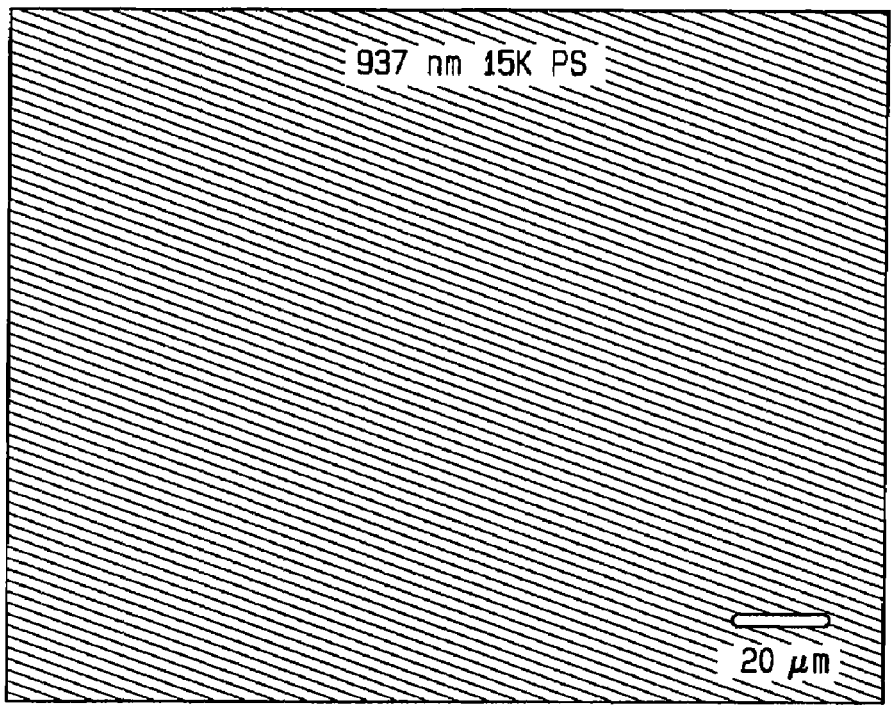
FIGS. 3A, 3B and 3C depict exemplary linear arrays made by the process of FIG. 1.

FIG. 3A shows a grating formed by the process of FIG. 1. This particular grating was produced from a polymer film having a thickness of about 937 nanometers. The process produced gratings with a period of about four micrometers.

Figure 3B:
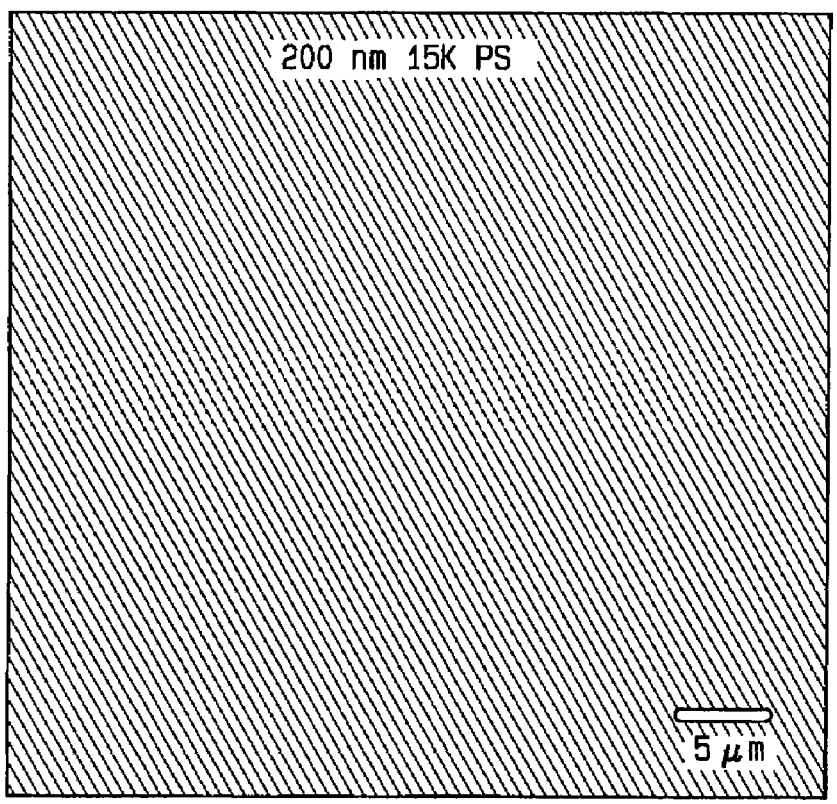

FIG. 3B shows a second grating formed by the FIG. 1 process from a polymer film having a thickness of about 200 nm. The grating has a period of about 800 nm corresponding to four times the film thickness.

Figure 3C:
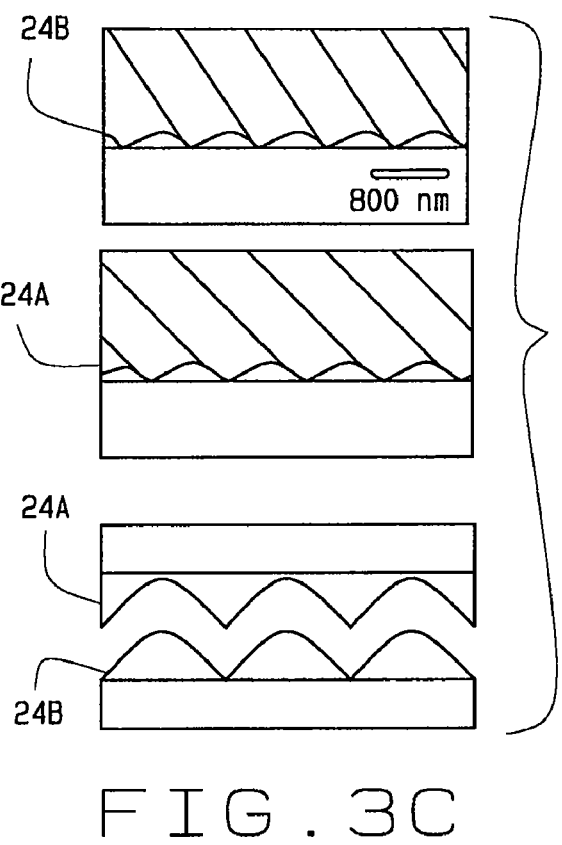

FIG. 3C shows a complementary pair of gratings 24A and 24B several days after formation. It further includes a diagram showing the interlocking morphology.

The final step (Block E) is to form a finished product. For example, a reflection grating can be finished by coating the polymer grating surface with reflective metal or by using the polymer grating as a mask for the deposit of the metal on the substrate and removing the polymer. Or a grating mold can be finished by using the array of polymer lines as an etch mask to etch recessed regions in the substrate between the polymer masked lines. To make other optical or semiconductor devices, the polymer lines can be used as masks for doping, for depositing materials such as metals, dielectrics, polysilicon or silicides, or for growing materials such as semiconductors, oxides or nitrides.

It is also noteworthy that one can control the portions of the substrate where polymer grating lines are formed. Such control can be achieved by coating the masking substrate with a pattern of mold release agent (MRA). Grating lines form only on the regions that are not coated with MRA.

Figure 7A:
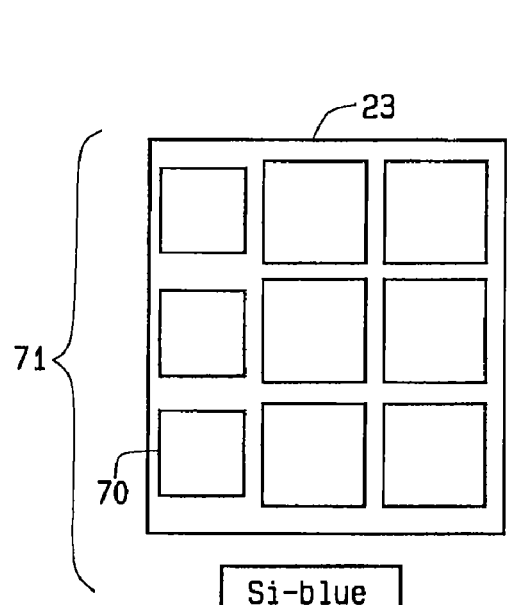
FIGS. 7A and 7B show control of the grating pattern by a mold release agent (MRA)
Figure 7B:
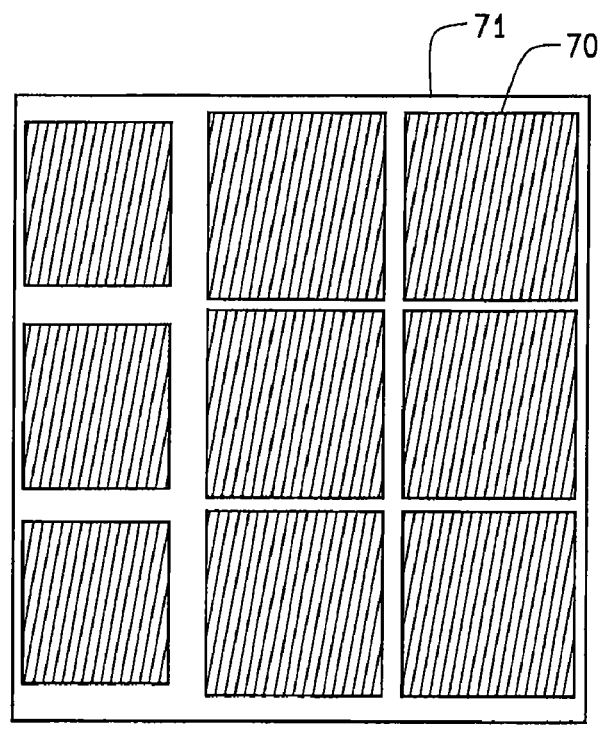

FIGS. 7 and 8 illustrate the use of MRA to control the regions of grating formation. FIG. 7A shows the pre-separation contact surface of a mask substrate 23 that is coated with MRA everywhere except for the rectangular regions 70. FIG. 7B illustrates the same surface after the separation step of the FIG. 1 process. The result of processing is a substrate 71 having gratings selectively in the uncoated rectangular regions 70.

Figure 8A:
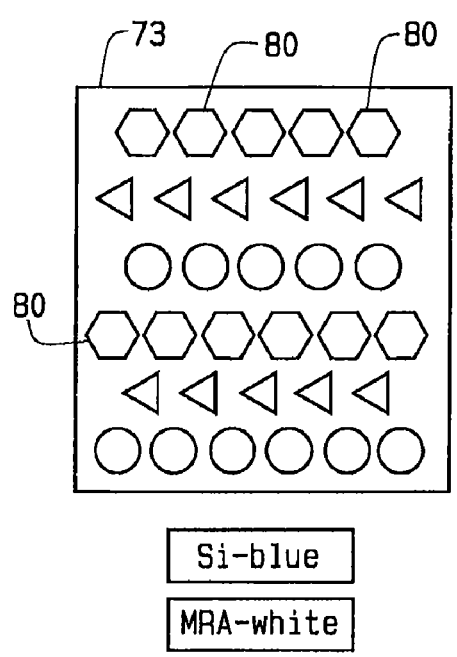
FIGS. 8A and 8B show a substrate having interior patterns of MRA (geometrical polygons)
Figure 8B:
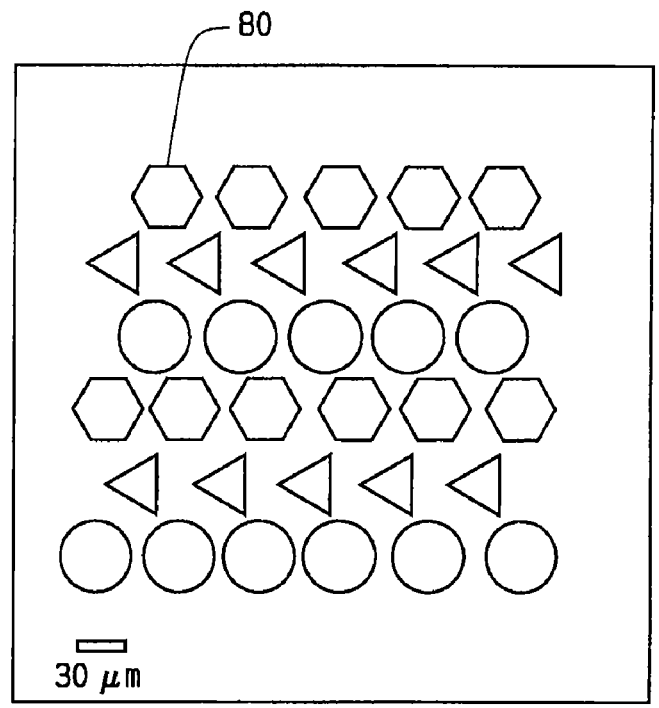
Figure 8C:
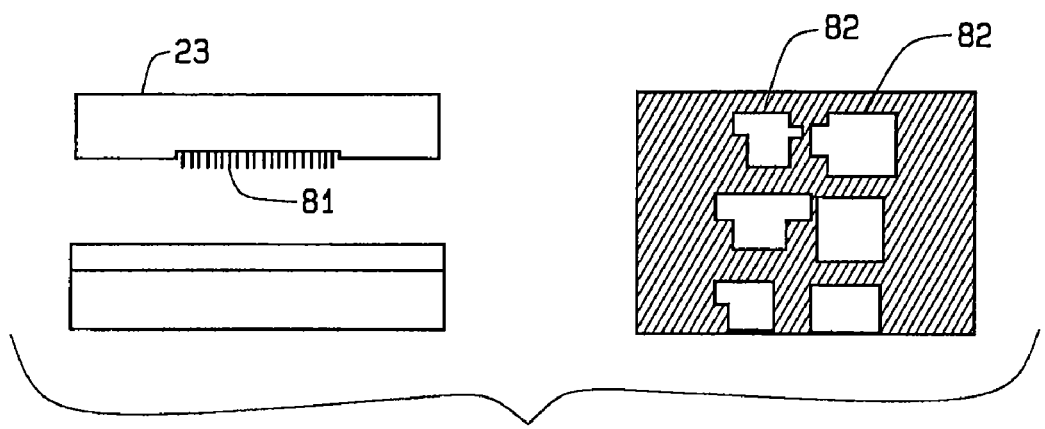
FIG. 8C is a cross section showing the effect of MRA application.

FIG. 8A illustrates a contact surface coated with MRA only in polygonal regions 80. The result of processing is a substrate (FIG. 8B) having no gratings within the polygons 80 but gratings elsewhere. FIG. 8C is a cross schematic section showing the affect of MRA application. Gratings do not form in the patterned areas 82 in contact with surfactant pattern 81.

Figure 9A:
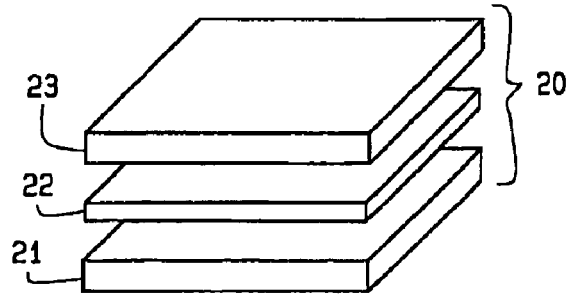
FIGS. 9A through 9H illustrate steps in the formation of two dimensional arrays.

The inventive method can also be used to form two dimensional arrays by plural applications of the FIG. 1 process to form plural linear arrays oriented in different directions. FIGS. 9A through 9H illustrate steps in the formation of an exemplary two-dimensional array. FIGS. 9A through 9C illustrate a first FIG. 1 process including provision of a workpiece 20 having a polymer film 22 between two substrates (21, 23) (FIG. 9A), adhering the film 22 to the substrates (FIG. 9B) and separating the substrates to leave one or more substrates 21 with a linear array 24 of polymer (FIG. 9C). As an exemplary next step, metal or polysilicon lines 90 can be deposited using the polymer array 24 as a mask and the polymer can be removed to leave a linear array of metal or polysilicon lines 90 on the substrate (FIG. 9D) For some applications, such as the formation of crossover connectors, it may be desired to form insulative coatings (not shown) on the metal or polysilicon lines 90, as by deposition or growth of oxide. Alternatively, the polymer array 24 can be used as a mask for doping lines or for etching or epitaxial growth of linear regions.

Figure 9E:
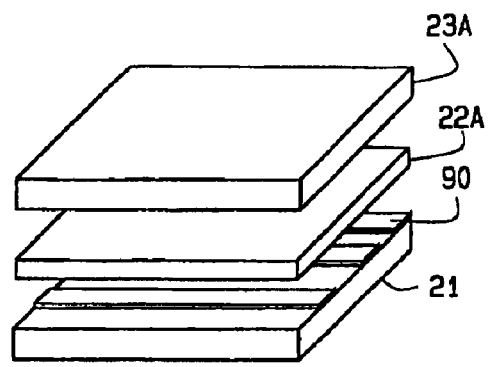
Figure 9B:
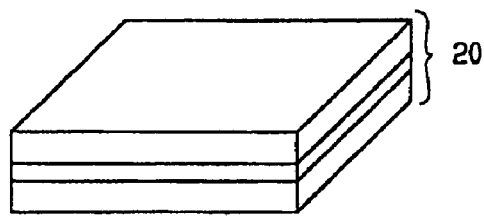
Figure 9F:
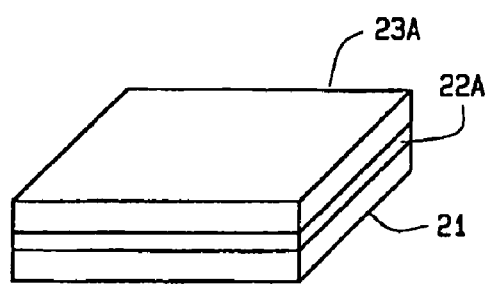
Figure 9C:
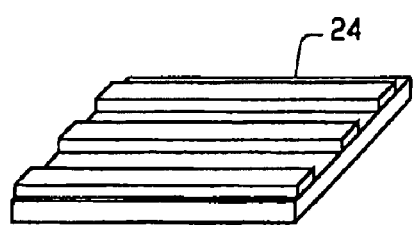
Figure 9G:
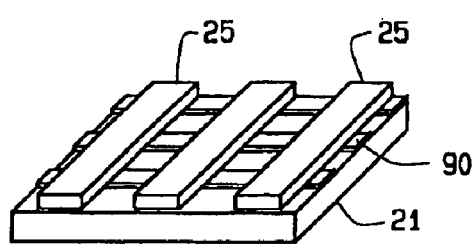
Figure 9D:
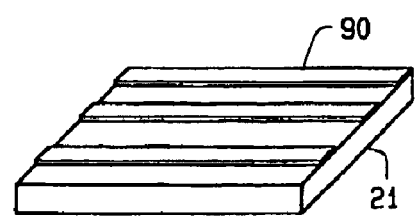

FIGS. 9E through 9G show a second FIG. 1 process using the substrate 21 having the linear array of metal or polysilicon lines 90. The resulting workpiece 20A is provided (FIG. 9E), the substrates are adhered to a new polymer layer 22A (FIG. 9F), and the substrates (21, 23A) are separated to form an array 25 of polymer lines oriented at an angle (90° in FIG. 9G) to the metal or polysilicon lines 90.

Figure 9H:
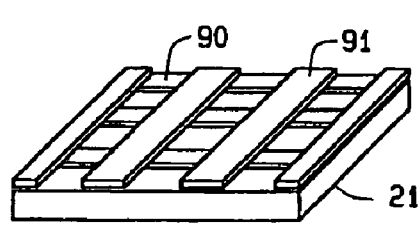

As an exemplary next step, the polymer lines 25 can be used to as a mask for the deposit of a second array of metal or polysilicon lines 91 intersecting the first array of metal or polysilicon lines 90. If the first array has been insulated, a two dimensional array of crossover connectors is formed (FIG. 9H). While lines 90 and 91 are oriented at 90° in this example, the direction of separation of the substrates can be chosen to produce any desired relative orientation angle between lines 90 and 91. Also the polymer array 25 could alternatively be used as a mask for doping, etching or growth of linear regions.

The invention can now be more clearly understood by consideration of the following specific example.

EXAMPLE 1

The pattern-free masks and substrates (WaferNet, prime grade) were made of p-type silicon (100) with boron doping (17-23 ohm-cm) and were covered with a layer of native oxide (approximately 20 to 30 angstroms). Substrates and masks were first cleaned with a high purity $CO_2$ jet. The wafers were dowsed in isopropanol and blown dry with a nitrogen gun. The mask wafer was spin coated with a 53 to 937 nm layer of 15K PS (Polymer Source). The mask was then laid over the substrate and placed in a press set to between 100 to 200 psi. The press was heated to a temperature between room temperature and 170° C., though 100° C. was most typical, for 15 minutes. After the temperature returned to ambient, the sample was removed from the press. The mask and substrate wafers were separated by applying a razor blade at one corner.

Samples heated at different temperatures ranging from 50° C. to 100° C. (±5°) were placed on a hot plate for several minutes and likewise separated. Taping the sample to two metal plates and lifting one while holding the other obtained similar separation. Film thicknesses were measured via ellipsometry with confirmation from profilometry. Gratings, which appear on both the mask and the substrate, were examined with scanning electron (LEO), atomic force (Digital Instruments) and optical microscopies (Nikon) as appropriate. At temperatures above 100° C., no gratings were formed.

II. The Underlying Physical Mechanisms

Figure 4A:
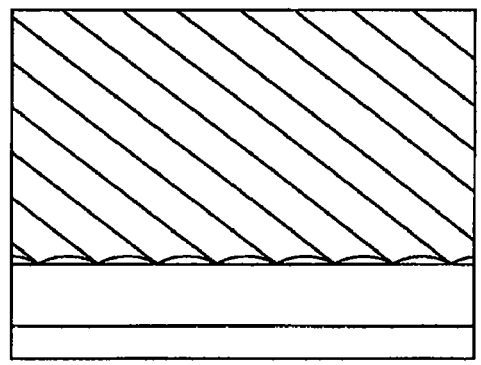
FIGS. 4A, 4B, 4C and 4D depict ESM and AFM micrographs of linear arrays made by the process of FIG. 1.
Figure 4B:
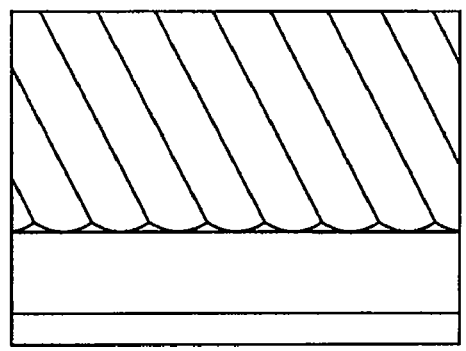
Figure 4C:
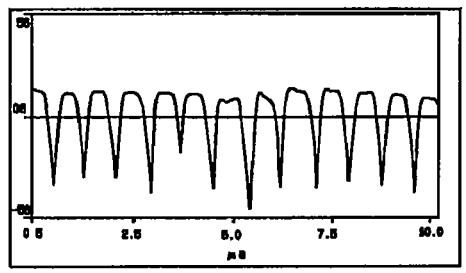
Figure 4D:
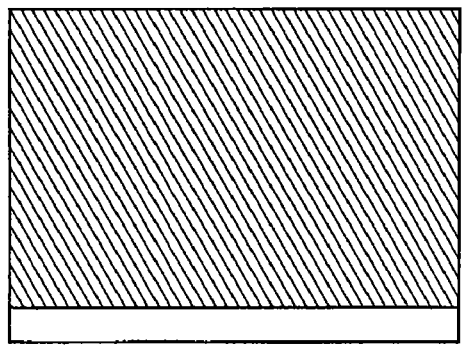

FIGS. 4A, 4B, 4C and 4D are SEM and AFM depict linear arrays made by the process of FIG. 1. Polymer was sandwiched between silicon wafers, annealed for 15 minutes at 100.degree. C. under 200 psi and separated at a temperature in the vicinity of boiling liquid N.sub.2. The resulting arrays are depicted in FIGS. 4A through 4D. The SEM cross-sections were coated with about 4 nanometers of iridium to enhance contrast. FIG. 4D includes chromium lines coated on the sample followed by removal of the polymer.

The gratings shown in FIG. 4 reflect the curved topology of the sample. The lines come in two primary morphologies. On one substrate the gratings appear as v-shaped crevices that penetrate some distance into the film but not necessarily down to the substrate. The corresponding region of the other substrate has a complementary morphology that interlocks with the v-shaped crevices (See FIG. 3C). Careful registration of AFM scans of the mask and substrate shows that the profiles interlock. Clearly the film failed cohesively. This interlocking registry contrasts with viscous and viscoelastic [8] and possibly elastic [9, 10] fingering mechanisms.

The flat AFM profile in FIG. 4C also suggests adhesive failure. Metal evaporated onto the gratings lifts off in the presence of solvents that dissolve the polymer intervening between the metal and the silicon. FIG. 4D shows lines of chromium that adhered to the silicon between stalactite-like ridges after the polymer was dissolved away confirming the additional mechanism of adhesive failure in the grating formation process.

FIGS. 5A through 5F show the lines produced by separation at different indicated temperatures. The samples were each annealed under 200 psi at 100.degree. C. for 15 mins and then separated at the temperature indicated. The figures show that gratings do not form above the glass transition temperature, but they will form when the sample is cooled below the glass transition temperature.

The temperature of separation is quite significant (FIG. 5). To ascertain its effects, the separation temperature was varied from that of boiling liquid nitrogen up to melting temperature of the polymer. At or below the glass transition temperature, gratings formed consistently. However, at temperatures greater than the glass transition temperature the gratings are completely absent. If the PS ($T_g$~92±3° C.) polymer is heated to 195° C. the silicon mask and substrate do not separate, but merely slide. When this same sample cooled back down to room temperature, the areas exposed during the slide were absent of lines but the regions of polymer bounded by the mask and substrate yielded large regions of regularly spaced lines. The annealing temperature affects neither the regularity nor periodicity of the gratings, neither does the pressure of the press so long as good contact is made. From these observations we conclude that the instability mechanism is primarily elastic and that the features are formed not prior to but upon lift off. Replacing the silicon mask with a clear piece of glass further supports these observations. Lines were absent from the samples prior to separation, but readily visible thereafter.

Figure 6A:
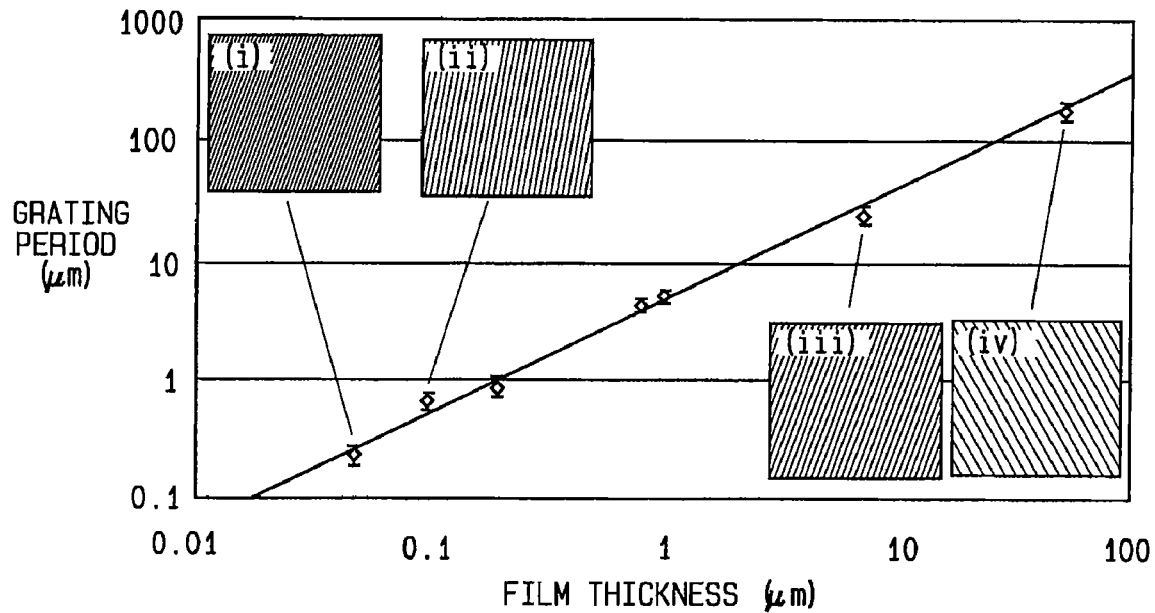
FIG. 6A is a graphical plot of the spacing period of the gratings as a function of the polymer layer thickness.
Figure 6B:
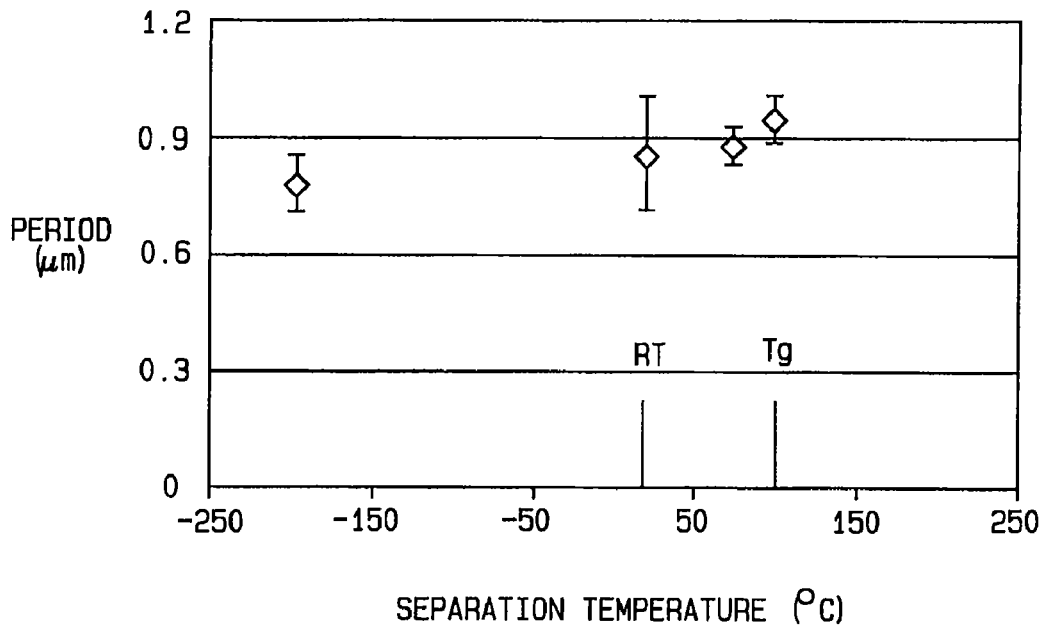
FIG. 6B plots the period as a function of the separation temperature.
Figure 6C:
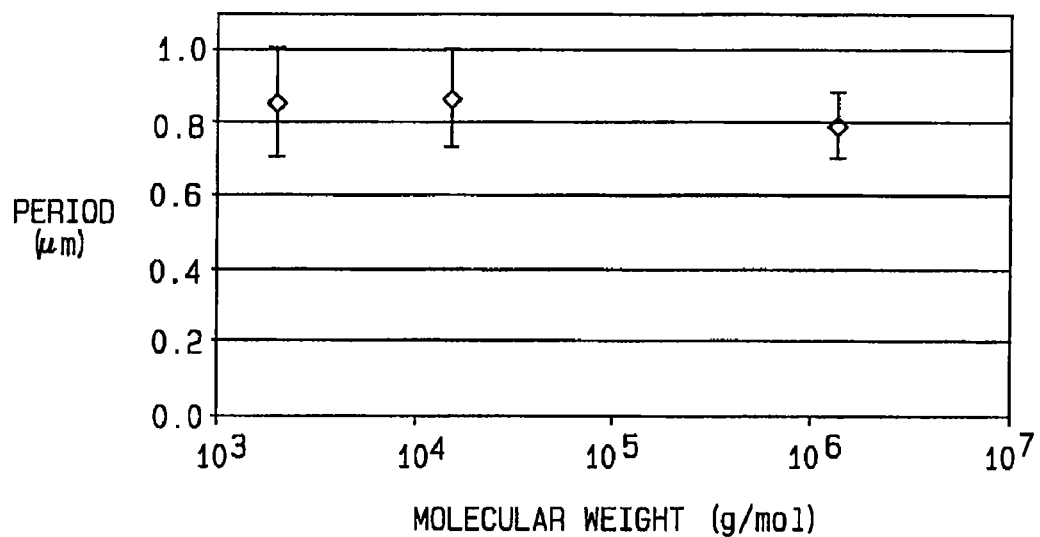
FIG. 6C graphs the period as a function of polymer molecular weight.

FIGS. 6A, 6B and 6C are graphical plots of the period $\lambda$ as respective functions of film thickness h, separation temperature, and polymer molecular weight respectively. As can be seen, the period depends primarily on the film thickness. FIG. 6A shows that the period of the gratings is directly proportional to the thickness of the film, $$\lambda \approx kh$$

where $\lambda$ is the period, h is the thickness, and k is a constant in the range of 3 to 5 inclusively. The period appears to be independent of the molecular weight, temperatures and pressure used to prepare the sample so long as good adhesion was achieved. The lines are remarkably regular over ten to hundreds of thousands of periods. Harmonics of this period appear, particularly near the edges of a region of gratings where line splitting and merging are not uncommon. The spacing reported here is absent of these harmonics and is remarkably repeatable from sample to sample.

Controlling the direction of the lines is nontrivial. The lines appear to develop from regions of higher stress to lower stress, which is generally from the edge of separation inward. Crazing can be distinguished from the parallel lines reported here, for crazing is absent when samples are separated under boiling liquid nitrogen; furthermore models[14] predict a period scaling as the square root of the film thickness in contrast to our experiments.

FIG. 6C graphs the period as a function of polymer molecular weight. The original film thickness was about 200 nanometers. The presence of the gratings and the scaling of the period are independent of the molecular weight. A variety of molecular weights ranging from 2 kg/mol up to 1,407 kg/mol were tried. Regardless of the molecular weight the gratings formed on each sample. No deviation from the above scaling law was noted: even at the highest molecular weights. At the lowest molecular weights the fracture surface should be dominated by cleavage of van der Waals bonds and by local pull out phenomena. Yet at the highest molecular weights smooth surfaces indicate that carbon-carbon bonds must be broken, since breaking one carbon-carbon bond in the back bone costs less energy than disrupting hundreds of van der Waals bonds. This insight is consistent with the qualitative impression that the force required for separation was greater than with the lower molecular weight samples. Our observations are consistent with a mechanism involving fracture[15].

One of the more remarkable features is the long-range quality of the gratings. The lines remain straight and parallel for hundreds of microns. They extend, in some cases, up to tens of thousands of periods and can remain parallel for centimeters, though occasionally domains appear. Some areas exceeding two square centimeters have been observed.

Control of the adhesive properties of the mask may lead to better control of which interface separates first and provide more useful features and applications. For example, masks patterned with a mold release agent[18] (MRA) everywhere except the shape yield gratings only within the shapes (FIG. 7). Conversely, if the MRA is in the shape, then lines form only external to the shape (FIG. 8). The corners reflect the curvature of the patterning on the masking substrate, suggesting an exact duplication is possible. Control of the pattern location opens up many opportunities to study crack development, the profile may be amenable to index matching[19] and the patterning technique itself, capable of generating thin films with deep sub-micron gratings, may be of interest to the fabrication and scientific communities. Others [17] have suggested patterning via cracking.

It is to be understood that the above described embodiments are illustrative of only a few of the many embodiments which can represent applications of the invention. Numerous and varied other arrangements can be made by those skilled in the art without departing from the spirit and scope of the invention.

What is claimed is:

1. A method of forming a pattern of spaced apart protruding linear regions on a substrate without the necessary use of patterned masks or molds comprising the steps of:
   providing a workpiece comprising a pair of rigid substrates and a layer of polymeric material sandwiched between a pair of substrates, each substrate having a smooth, continuous contact surface and a layer of polymeric material sandwiched between the contact surfaces;
   adhering the polymeric material to each contact surface; and
   separating the substrates perpendicular to the layer of polymeric material thereby separating the adhered layer of polymeric material by cohesive failure so that the polymer separates across the layer into two different regions adhered to respective substrates to form patterns of spaced apart protruding linear regions on the respective substrates.

2. The method of claim 1 wherein the workpiece is provided by coating the polymeric material on a first of the two substrates and contacting the polymeric coating with the second substrate.

3. The method of claim 2 wherein the coating comprises spin coating or dip coating.

4. The method of claim 1 wherein the workpiece is provided by placing a layer of polymeric material between the substrates.

5. The method of claim 1 wherein the adhering of the polymeric material to the substrates comprises pressing the substrates against the polymeric material.

6. The method of claim 5 wherein the pressing is at a pressure in excess of about 10 psi.

7. The method of claim 1 wherein the adhering of the polymeric material comprises heating the polymeric material.

8. The method of claim 7 wherein the polymeric material has a glass transition temperature and the heating is to a temperature above the glass transition temperature.

9. The method of claim 8 wherein the polymeric material is cooled below the glass transition temperature prior to the separating.

10. The method of claim 1 further comprising the step of applying release agent to at least one of the substrates.

11. The method of claim 10 wherein the release agent is applied to at least one of the substrates in a pattern to define areas of the substrate wherein linear regions are not formed.

12. The method of claim 1 wherein the polymer layer has a thickness of about 1000 nanometers or less.

13. The method of claim 1 wherein the spaced apart protruding regions are regularly spaced apart for more than about 100 periods.

14. The method of claim 1 wherein the spaced apart protruding linear regions have a period in the range of 200 nanometers to 5 micrometers.

15. The method of claim 1 wherein the layer of polymeric material has a thickness h and the spaced apart protruding linear regions have a period $\lambda$ substantially equal to kh, where k is a constant in the range of 3 to 5, inclusive.

16. The method of claim 1 wherein the layer of polymeric material has a thickness of less than about 1 millimeter.

17. The method of claim 1 wherein at least one of the substrates comprises a material selected from among the group consisting of glass, semiconductors, metals and ceramics.

18. The method of claim 17 wherein at least one of the substrates comprises silicon.

19. The method of claim 1 wherein the polymeric material comprises a material selected from the group consisting of polystyrene, poly(methyl methacrylate), polycarbonate, poly-L-lactide, and polystyrene blends.

20. The method of claim 19 wherein the substrates comprise silicon and the polymeric material comprises polystyrene.

21. The method of claim 1 wherein the separating comprises separating with a blade.

22. The method of claim 1 comprising the additional step, after separation, of the coating the pattern of protruding linear regions with metal.

23. The method of claim 1 comprising the additional step, after separation, of using the pattern as a mask to etch the substrate.

24. The method of claim 1 comprising the additional step, after separation, of using the pattern as a mask for the deposit of material over the substrate.

25. The method of claim 1 comprising the additional step, after separation, of using the pattern as a mask for the growth of material over the substrate.

26. The method of claim 1 comprising the additional step, after separation, of using the pattern as a mask for the doping of the substrate with impurities.

27. A method of forming a two dimensional array of intersecting linear regions on a substrate comprising the steps of:
   forming a first pattern of spaced apart linear regions on a substrate at a first orientation in accordance with the method of claim 1; and
   forming a second pattern of spaced apart linear regions on the substrate in accordance with the method of claim 1, the linear regions of the second pattern oriented at a second orientation different from the first orientation.

28. The method of claim 27 wherein the formation of the first pattern comprises using the polymer protruding regions as a mask for the deposition or growth of material.

29. The method of claim 28 wherein the formation of the second pattern comprises using the polymer protruding regions as a mask for the deposition or growth of material.

30. A method of forming a pattern of spaced apart protruding linear regions on a substrate without the necessary use of patterned masks or molds comprising the steps of:
  providing a pair of rigid substrates, each rigid substrate having a substantially smooth, continuous contact surface;
  sandwiching a layer of material between the contact surfaces of the pair of substrates; and separating the pair of substrates to form an array of substantially periodic lines and spaces of the material on each substrate, wherein at least one of the substrates comprises a material selected from the group consisting of glass, quartz, semiconductors, ceramics and metals.

31. The method of claim 30 wherein the layer of material has a thickness in the range 50 to 1,000,000 nanometers.

32. The method of claim 31 wherein the array of periodic lines and spaces has a period corresponding to about four times the thickness of the layer of material.

33. The method of claim 30 further comprising the step of pressing the substrates against the layer of material to enhance adhesion between the layer and the substrate.

34. The method of claim 30 further comprising the step of heating the layer of material to enhance adhesion between the layer and the substrates.

* * * * *